United States Patent
Scharp et al.

(10) Patent No.: US 8,635,982 B2
(45) Date of Patent: Jan. 28, 2014

(54) PISTON FOR AN INTERNAL COMBUSTION ENGINE AND METHOD FOR ITS PRODUCTION

(75) Inventors: Rainer Scharp, Vaihingen (DE); Klaus Keller, Lorch (DE)

(73) Assignee: MAHLE International GmbH, Stuttgart (DE)

( * ) Notice: Subject to any disclaimer, the term of this patent is extended or adjusted under 35 U.S.C. 154(b) by 159 days.

(21) Appl. No.: 13/066,550

(22) Filed: Apr. 18, 2011

(65) Prior Publication Data

US 2012/0037111 A1 Feb. 16, 2012

(30) Foreign Application Priority Data

Aug. 10, 2010 (DE) .......................... 10 2010 033 881

(51) Int. Cl.
*F02F 3/00* (2006.01)

(52) U.S. Cl.
USPC ................ 123/193.6; 123/193.1; 29/888.043; 29/888.042; 148/220

(58) Field of Classification Search
USPC ......... 123/193.6, 193.1, 193.4; 148/220, 226; 29/888.043, 888.042, 888.04; 219/635, 219/639; 92/187, 208; 428/582; 164/364, 164/128, 137, 132, 348, 271
See application file for complete search history.

(56) References Cited

U.S. PATENT DOCUMENTS

| | | | | |
|---|---|---|---|---|
| 6,155,157 | A * | 12/2000 | Jarrett ............................. | 92/186 |
| 6,260,472 | B1 * | 7/2001 | Zhu et al. ........................ | 92/214 |
| 6,286,414 | B1 * | 9/2001 | Kruse ............................. | 92/186 |
| 6,327,962 | B1 * | 12/2001 | Kruse ............................. | 92/186 |
| 6,588,320 | B2 * | 7/2003 | Gaiser et al. .................... | 92/231 |
| 6,736,305 | B2 * | 5/2004 | Foster et al. .................. | 228/113 |
| 6,825,450 | B2 * | 11/2004 | Ribeiro et al. ................ | 219/635 |
| 6,840,155 | B2 * | 1/2005 | Ribeiro et al. .................... | 92/186 |
| 7,005,620 | B2 * | 2/2006 | Ribeiro et al. ................ | 219/635 |
| 7,341,037 | B2 * | 3/2008 | Parker et al. ............... | 123/193.6 |
| 2004/0149739 | A1 * | 8/2004 | Ribeiro et al. ................ | 219/635 |
| 2006/0207424 | A1 * | 9/2006 | Gaiser ............................. | 92/222 |

FOREIGN PATENT DOCUMENTS

| | | |
|---|---|---|
| DE | 10 2007 006 948 | 12/2007 |
| EP | 0 985 739 | 3/2000 |

OTHER PUBLICATIONS

DIN EN 10052, Jan. 1994. (Spec, p. 4).
DIN EN 10083-1, Oct. 2006, DIN EN 10083-2, Oct. 2006 and DIN EN 10083-3, Jan. 2007. (Spec, p. 10 and 13).
DIN EN 10267, Feb. 1998. (Spec, p. 10).

* cited by examiner

*Primary Examiner* — Noah Kamen
*Assistant Examiner* — Long T Tran
(74) *Attorney, Agent, or Firm* — Collard & Roe, P.C.

(57) ABSTRACT

A method for producing a piston for an internal combustion engine, composed of first and second piston components, has the following steps: (a) providing a blank of the first piston component composed of a tempered or precipitation-hardened steel, having at least one joining surface, (b) providing a blank of the second piston component composed of a tempered or precipitation-hardened steel, having at least one joining surface, (c) tempering or precipitation-hardening the blanks, (d) friction-welding the joining surfaces of the blanks to produce a piston blank, with the formation of at least one friction-welding seam and a heat influence zone in the region of the at least one friction-welding seam, (e) annealing or low-stress annealing of the piston blank, thereby obtaining the heat influence zone(s), (f) re-machining and/or finishing the piston blank to produce a piston. A piston so produced is also provided.

16 Claims, 5 Drawing Sheets

PISTON FOR AN INTERNAL COMBUSTION ENGINE AND METHOD FOR ITS PRODUCTION

CROSS REFERENCE TO RELATED APPLICATIONS

Applicants claim priority under 35 U.S.C. §119 of German Application No. 10 2010 033 881.8 filed on Aug. 10, 2010, the disclosure of which is incorporated by reference.

BACKGROUND OF THE INVENTION

1. Field of the Invention

The present invention relates to a method for the production of a piston for an internal combustion engine, composed of a first piston component and a second piston component. The present invention furthermore relates to such a piston for an internal combustion engine. The present invention furthermore relates to a piston for an internal combustion engine, composed of a first piston component and a second piston component, whereby the first piston component has a piston crown, a circumferential top land, and a circumferential ring belt provided with ring grooves, as well as a piston skirt.

2. The Prior Art

Pistons for modern internal combustion engines are increasingly designed for reduced oil consumption. Since the thermal and mechanical stress on the pistons is increasingly rising at the same time, in modern internal combustion engines, there is the risk that the piston will not be sufficiently supplied with oil during engine operation. This results in greater tribological stresses. This in turn results in increased wear and thus in a reduction in the useful lifetime of the piston. For this reason, attempts are made to harden partial regions or partial structures of the piston that are subject to this increased wear, such as, for example, the lower groove flank of the first ring groove, for example by means of nitriding (see EP 0 985 739 A1) or by means of laser beams (see DE 10 2007 006 948 A1). These measures are connected with increased effort and thus with increased costs.

SUMMARY OF THE INVENTION

The task of the present invention consists in further developing a method for the production of a piston, in such a manner that hardening of a partial region or a partial structure is made possible, with reduced effort.

The solution consists in a method having the following steps: a) making available a blank of the first piston component composed of a tempered steel or a precipitation-hardened steel, having at least one joining surface; (b) making available a blank of the second piston component composed of a tempered steel or a precipitation-hardened steel, having at least one joining surface; (c) tempering the blanks; (d) connecting the blank of the first piston component with the blank of the second piston component by way of their joining surfaces, by means of friction welding, to produce a piston blank, with the formation of at least one friction-welding seam as well as a heat influence zone in the region of the at least one friction-welding seam; (e) annealing or low-stress annealing of the piston blank, thereby obtaining the heat influence zone; (f) re-machining and/or finishing the piston blank to produce a piston. The piston according to the invention is characterized in that the first piston component and/or the second piston component consist(s) of a tempered steel or a precipitation-hardened steel, and are connected with one another by means of friction welding, and that the at least one friction-welding seam is surrounded by a heat influence zone.

Tempering is understood to mean a heat treatment of steel that consists of hardening and annealing, by means of which treatment the desired hardness and strength of the steel are adjusted. In this connection, hardening means a heat treatment of steel, consisting of austenitization and rapid cooling, with the goal of martensite and/or bainite formation. Annealing is any heating of a work piece made of steel to temperatures below the lower conversion point Ac1 in the iron/carbon diagram, holding, and subsequent cooling. Low-stress annealing is understood to be a heat treatment by means of which internal stresses that occur during cooling of a work piece are reduced, without any significant change in structure.

The terms used in this patent application, such as hardening, annealing, tempering, low-stress annealing, etc., refer to DIN EN 10052.

In the case of tempered steel or precipitation-hardened steel (AFP steel), hardening takes place in the immediate vicinity of the friction-welding seam, by means of the friction welding. In the state of the art, blanks composed of such steels might be pre-machined, connected with one another in the soft state, by means of friction welding, and only the resulting piston blank is subsequently tempered. In this way, the soft material is hardened, but the hardening is cancelled out again in the immediate vicinity of the friction-welding seam.

The idea according to the invention consists in first tempering the blanks or bringing them to the desired strength by means of another targeted heat treatment after the forging process (precipitation hardening), and then connecting them with one another in this state, by means of friction welding. In this case, too, hardening takes place in the immediate vicinity of the friction-welding seam. The hardness increases by up to 400 HV (Vickers) in this region. This hardened region is referred to as "heat influence zone" in this patent application. The heat influence zone is harder than the tempered or precipitation-hardened material of the piston blank outside of the heat influence zone.

Tempering after friction welding is no longer necessary, according to the method according to the invention. Instead, the piston blank that results from the friction welding is only subjected to annealing or low-stress annealing afterwards, in order to reduce any stresses that might be present. In this connection, the hardness in the heat influence zone drops slightly, but greater hardening with a hardness of up to 250 HV (Vickers) remains. The heat influence zone in the finished piston is therefore a region around the friction-welding seam that has a greater hardness than the remaining material of the piston.

This heat influence zone is utilized, according to the invention, for hardening of partial regions or partial structures of the piston that are subject to greater wear. For this purpose, the friction-welding seam is positioned, or the joining surfaces of the blanks of the piston components to be connected by means of friction welding are positioned in such a manner that the partial regions or partial structures of the piston to be produced, which are subject to greater wear and therefore are supposed to be hardened, lie in the heat influence zone after friction welding. In this way, it is no longer necessary to subject these partial regions or partial structures to a separate hardening process, such as nitriding or laser-beam treatment.

The present invention is suitable for all piston construction variants according to the claims, as well as for all piston components that consist of a steel material that is accessible to tempering.

Advantageous further developments are evident from the dependent claims.

The blanks can be forged or cast, and it is practical if they are pre-machined before friction welding, in order to shape structures such as pin bores, combustion chamber bowl, and cooling channel parts, for example, more precisely than is possible by means of forging or casting.

A preferred embodiment consists in that the at least one friction-welding seam is configured in such a manner that it runs at an acute angle or at a obtuse angle relative to the piston center axis, in the radial direction. In this way, supported centering of the two piston components is possible at the beginning of the friction-welding process. Additional guide surfaces, guide edges, or the like are therefore not required.

A particularly preferred further development provides that at least one blank is provided with at least one ring groove, and at least one pair of corresponding joining surfaces of the blanks are positioned in such a manner that after step (d), the distance of a lower groove flank of a ring groove from the center of the outer friction-welding seam is less than the axial height of the heat influence zone of the friction-welding seam. An alternative to this consists in that in step (f), the piston blank is provided with at least one ring groove, in such a manner that the distance of a lower groove flank of a ring groove from the center of the at least one friction-welding seam is less than the axial height of the heat influence zone of this friction-welding seam. In this manner, the ring grooves, which are subject to greater wear, can be hardened. This particularly relates to the lower groove flank of the first ring groove.

The method according to the invention is suitable, for example, for pistons that have a piston base body having a piston skirt as the first piston component, and a piston ring element having a piston crown, a circumferential top land, and a circumferential ring belt provided with ring grooves as the second piston component, whereby the piston base body and the piston ring element form a circumferential cooling channel. Particularly for such pistons, in step (a) a blank of the piston base body is made available, having an outer joining surface and an inner joining surface as well as a circumferential lower cooling channel part between the two joining surfaces, and in step (b), a blank of the piston ring element is made available, having an outer joining surface and an inner joining surface, as well as a circumferential upper cooling channel part between the two joining surfaces. The blank of the piston ring element can have a combustion chamber bowl. Instead, the blank of the piston ring element can have at least one wall region of a combustion chamber bowl. In this case, the blank of the piston base body has at least one crown region of a combustion chamber bowl.

BRIEF DESCRIPTION OF THE DRAWINGS

Exemplary embodiments of the present invention will be explained in greater detail below, using the attached drawings. These show, in a schematic representation, not true to scale:

FIG. 1b an enlarged detail view of the piston according to FIG. 1a;

FIG. 2b an enlarged detail view of the piston according to FIG. 2a;

DETAILED DESCRIPTION OF THE PREFERRED EMBODIMENTS

Figure 1A:
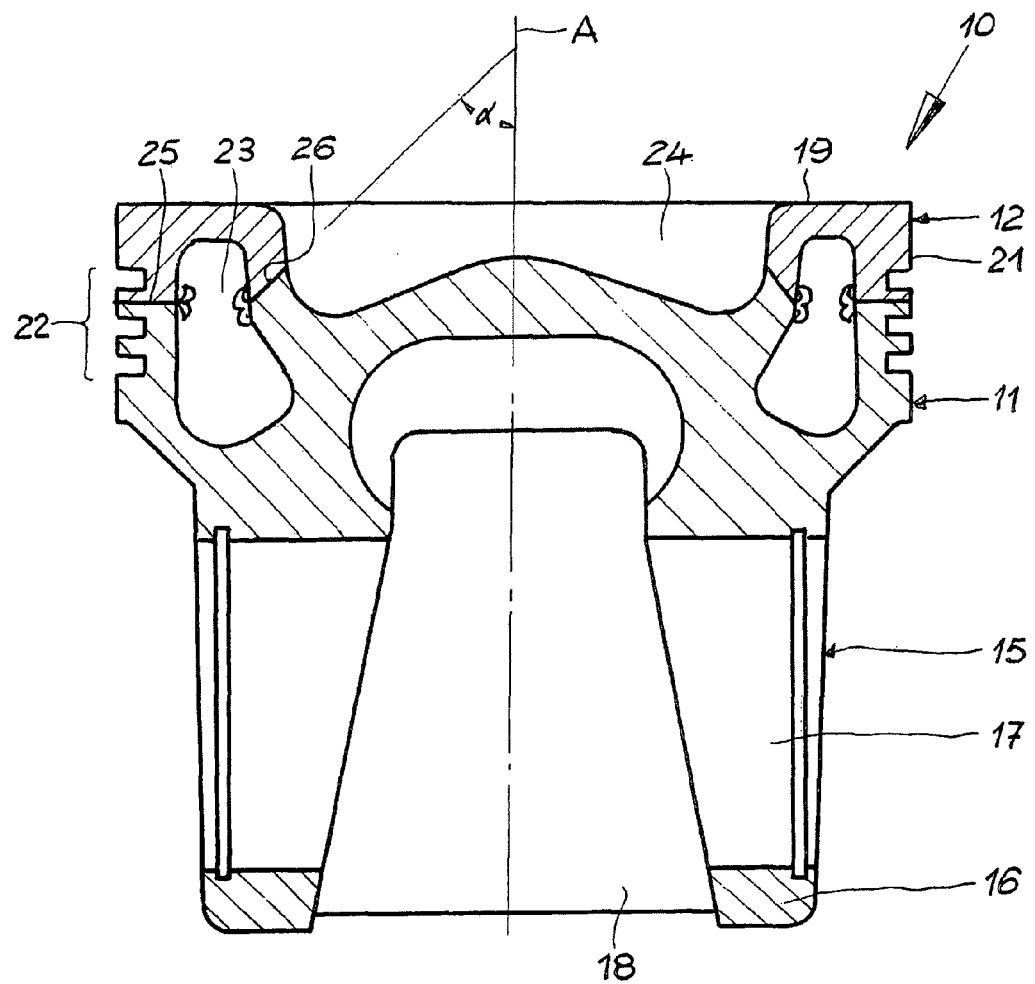
FIG. 1a an exemplary embodiment of a piston according to the invention, in section.
Figure 1B:
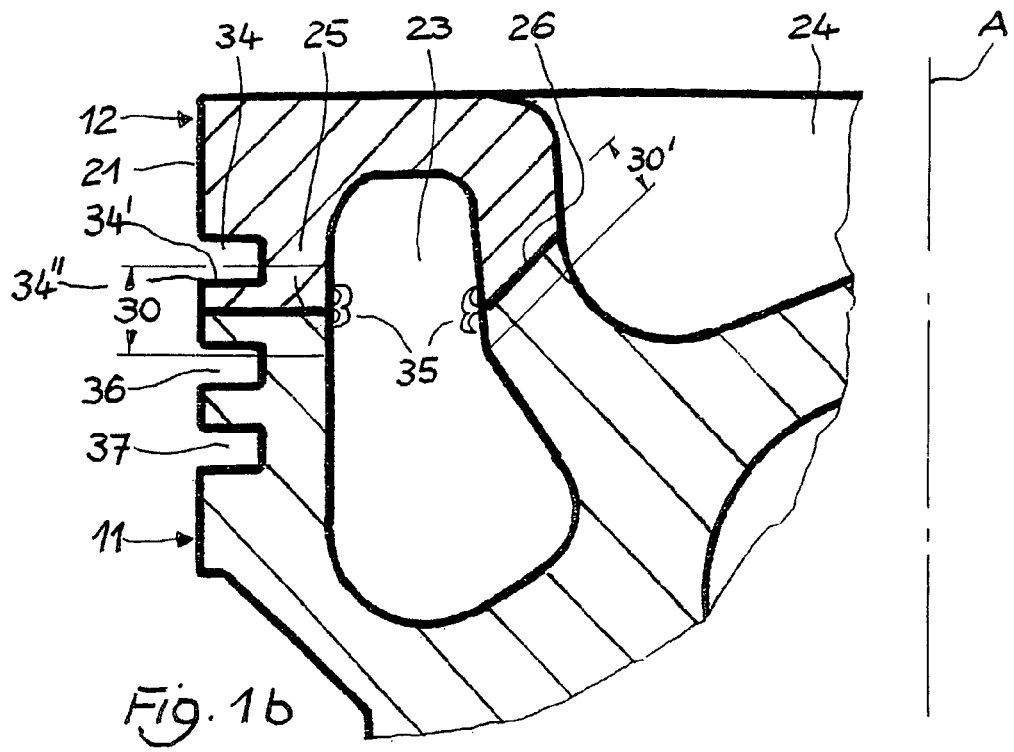

FIGS. 1a and 1b show a first exemplary embodiment of a piston 10 according to the invention. The piston 10 consists of a piston base body 11 and a piston ring element 12. Both components can consist of any steel material, particularly according to DIN EN 10083 or DIN EN 10267, which can be subjected to tempering and is suitable for friction welding.

In the exemplary embodiment, the piston base body consists of AFP steel. The piston base body 11 has a piston skirt 15 that is provided, in known manner, with pin bosses 16 and pin bores 17 for accommodating a piston pin (not shown), as well as skirt regions 18 having working surfaces (not shown). In the exemplary embodiment, the piston ring element 12 is also produced from 42CrMo4. The piston ring element 12 has a piston crown 19 as well as a circumferential top land 21. The piston base body 11 and the piston ring element 12 form a circumferential ring belt 22 for accommodating piston rings (not shown), a circumferential, closed cooling channel 23, as well as a combustion chamber bowl 24.

The piston base body 11 and the piston ring element 12 are connected with one another in known manner, by means of friction welding. Accordingly, the piston 10 has an outer friction-welding seam 25 in the region of the ring belt 22 and an inner friction-welding seam 26 in the region of the combustion chamber bowl 24. In the exemplary embodiment, the outer friction-welding seam 25 runs perpendicular to the center axis A of the piston 10, while the inner friction-welding seam 26 runs at an acute angle α relative to the center axis A. The course of the inner friction-welding seam 26 allows unsupported centering of the piston ring element 12 on the piston base body 11. Of course, any other desired position and angle combinations of the friction-welding seams are possible with regard to the course of the friction-welding seams.

Figure 2A:
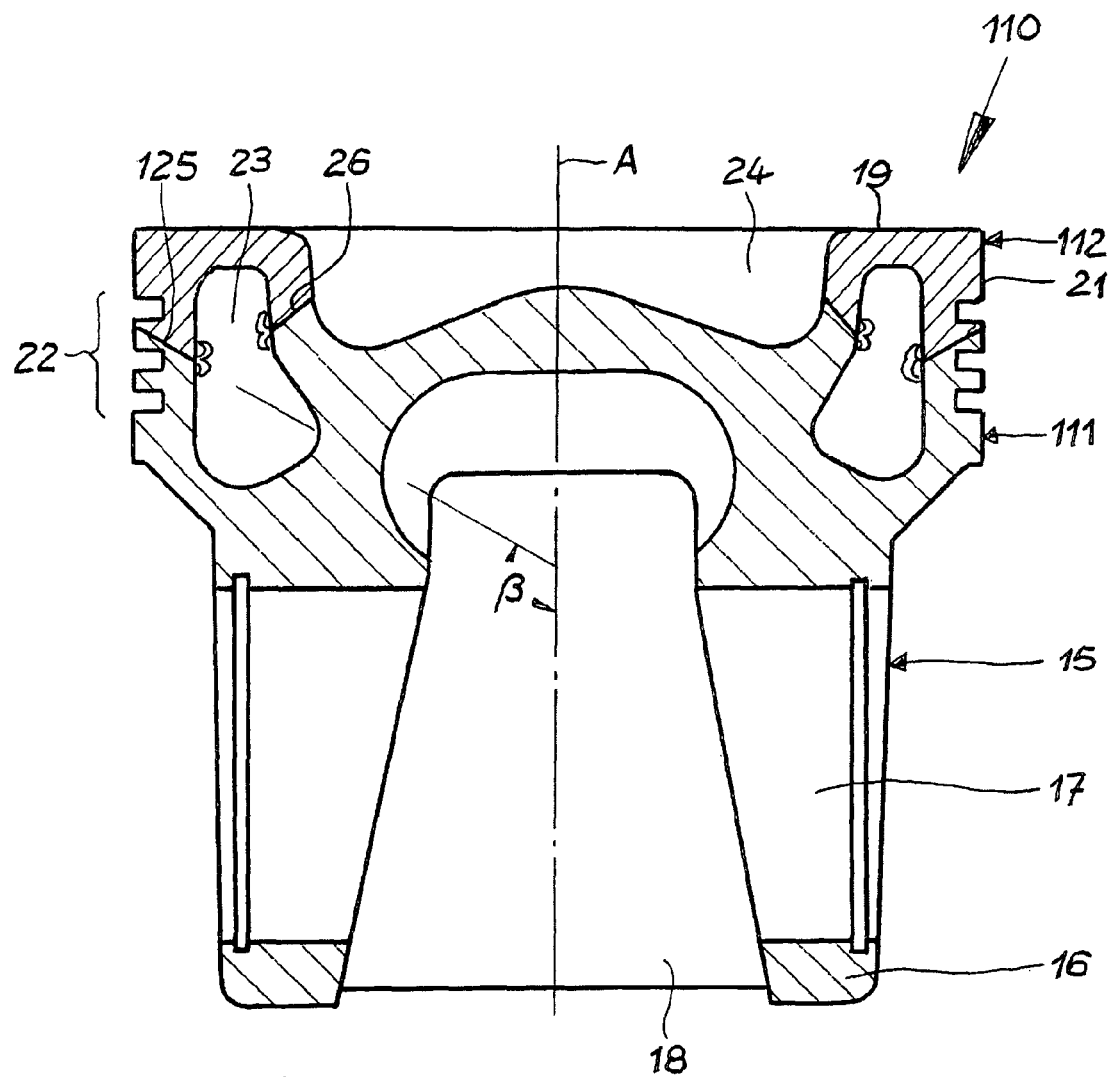
FIG. 2a another exemplary embodiment of a piston according to the invention, in section.
Figure 2B:
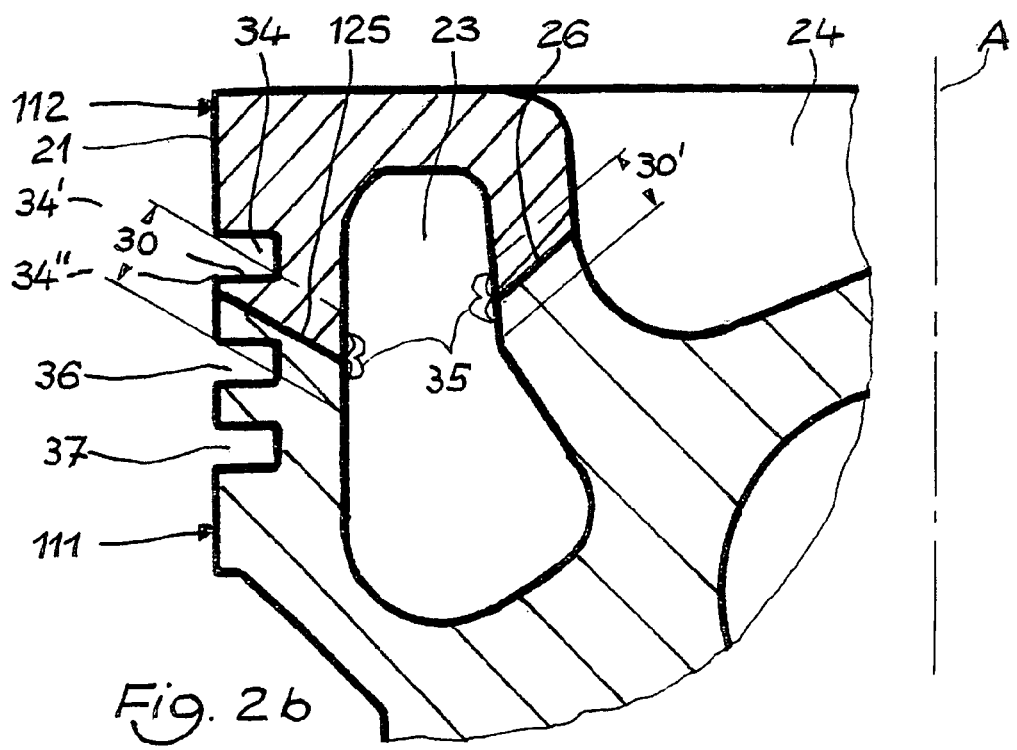

FIGS. 2a and 2b show another exemplary embodiment of a piston 110 according to the invention, composed of a piston base body 111 and a piston ring element 112. The piston 110 essentially corresponds to the piston 10 according to FIGS. 1a and 1b, so that structural elements that agree with one another are provided with the same reference symbols, and reference is made, in this regard, to the above description of FIGS. 1a and 1b. The only difference consists in that the outer friction-welding seam 125 runs at an obtuse angle β relative to the center axis A of the piston 110. In combination with the friction-welding seam 26, which runs at an acute angle α relative to the center axis A, these position and angle combinations of the friction-welding seams allow particularly reliable supportive centering of the piston ring element 12 on the piston base body 11.

FIGS. 3 to 6 show another exemplary embodiment of a piston 210 according to the invention, as well as an exemplary embodiment of a production method according to the invention, for all the exemplary embodiments of the piston 10, 110, 210 according to the invention. The piston 210 essentially corresponds to the piston 10 according to FIGS. 1a and 1b, so that structural elements that agree with one another are provided with the same reference symbols, and reference is made, in this regard, to the above description of FIGS. 1a and 1b. The only difference consists in that the inner friction-welding seam 226 runs perpendicular β relative to the center axis A of the piston 210.

The pistons 1, 110, 210 according to the invention are produced in the manner described below. The production method is described for the piston 210, but the description applies analogously for the pistons 10, 110.

Figure 3:
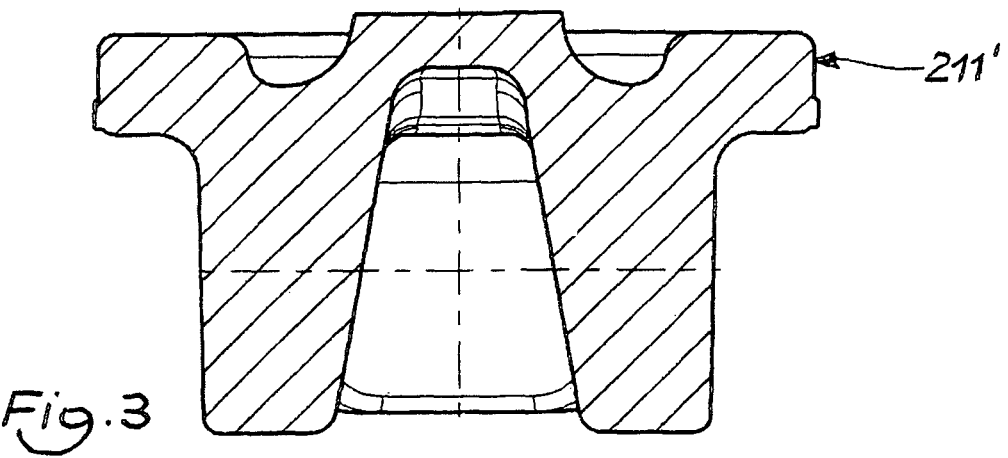
FIG. 3 an exemplary embodiment of a blank of a piston base body and of a blank of a piston ring element, for the production of a piston according to the invention, in section.

According to FIG. 3, first a blank 211' of the piston base body 211 as well as a blank 212' of the piston ring element 212 are made available, for example by means of forging or casting or sintering. In the exemplary embodiment, ring belt, cooling channel, combustion chamber bowl, pin bosses and pin bores are not machined, or not machined completely. The upper piston part can also be produced by means of ring rolling or by means of being cut from a pipe.

The blanks 211', 212' are adjusted to the desired strength after casting or forging, in known manner, by means of tempering or precipitation hardening.

The guideline data of DIN EN 10083 apply for tempering: For 42CrMo4: austenitization at 850° C., hardening/quenching in oil, annealing at 600° C.;

Precipitation hardening 38MnVS6: solution annealing at approximately 1280° C., forming up to approximately 1000° C., then controlled air cooling to <600° C. After the heat treatment, the blanks 211', 212' have a hardness of 240-360 HV (Vickers).

Figure 4:
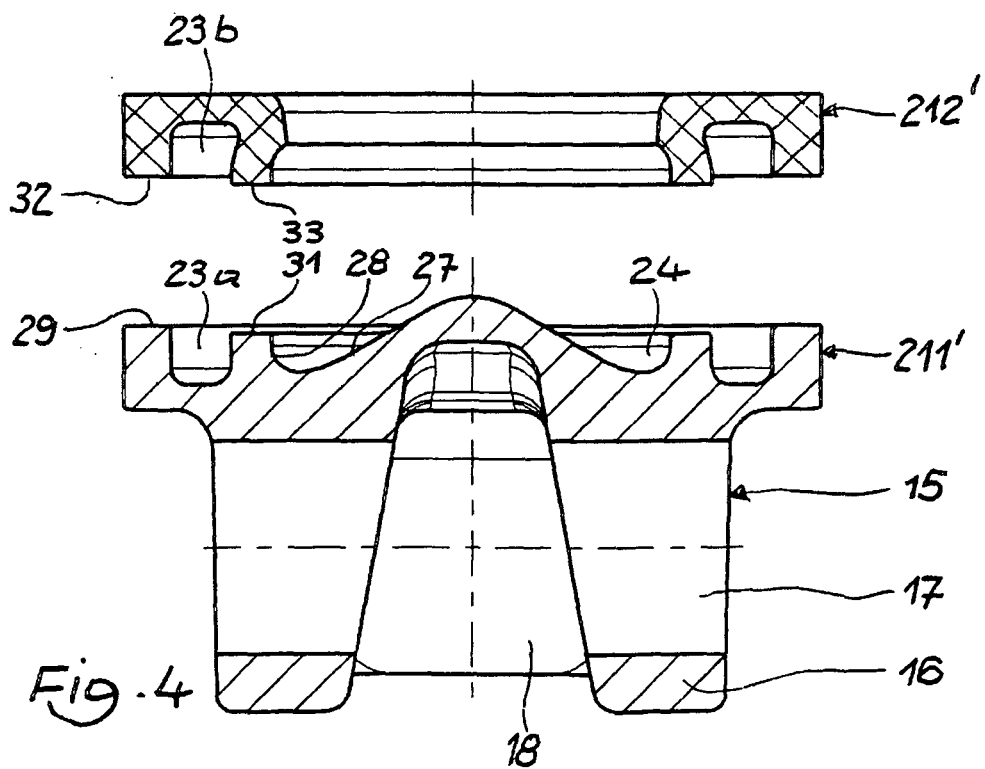
FIG. 4 the blanks according to FIG. 3 after pre-machining.

In the exemplary embodiment, the blanks 211', 212' are pre-machined according to FIG. 4 after the heat treatment.

In the exemplary embodiment, the crown region 27 as well as a part of a wall region 28 of the combustion chamber bowl 24 is worked into the blank 211' of the piston base body 211, for example lathed in. Furthermore, the pin bosses 16 and pin bores 17 as well as the skirt regions 18 with the working surfaces are worked in. Finally, a circumferential lower cooling channel part 23a of the cooling channel 23 is worked in. This results in an outer joining surface 29 and an inner joining surface 31. In the exemplary embodiment, the remaining part 28' of the wall region of the combustion chamber bowl 24 is worked into, for example lathed into the blank 212' of the piston ring element 212. Furthermore, a circumferential upper cooling channel part 23b of the cooling channel 23 is worked in. This results in an outer joining surface 32 and an inner joining surface 33.

The outer joining surface 29 of the blank 211' corresponds with the outer joining surface 32 of the blank 212'. In corresponding manner, the inner joining surface 31 of the blank 211' corresponds with the inner joining surface 33 of the blank 212'. This means that the two blanks 211', 212' can be connected along their joining surfaces 29, 31 and 32, 33, respectively, to form a piston blank 210'. To connect the two blanks 211', 212', these are braced in alignment, in known manner, whereby supportive centering can take place by means of the weld seam positions chosen. Welding of the parts then takes place by way of the known flywheel friction-welding method, which is sufficiently known from the state of the art.

By means of the friction-welding process, a heat influence zone 30, 30' as shown in FIGS. 1b and 2b forms around the friction-welding seams 25, 226 that have formed. The heat influence zones extend above and below the friction-welding seams 25, 26, 125, 226, over about 1 to 3 mm, in each instance. In the region of the heat influence zones 30, 30', the hardness is increased by up to 400 HV (Vickers) as compared with the tempered material of the blanks 211', 212' outside of the heat influence zones 30, 30'. This means that maximal hardness values of approximately 600 to 800 HV (Vickers) occur in the region of the heat influence zones 30, 30'.

In the exemplary embodiment, the resulting piston blank 210' is subjected to heat treatment, namely annealing or low-stress annealing, preferably for 1 h at 550° C., after friction welding. This heat treatment leads to the result that the hardness of the material is reduced by about 200 HV (Vickers) in the heat influence zones 30, 30'. The remaining regions experience no change in hardness by means of the heat treatment. Thus, a permanent difference in hardness remains in existence between the harder heat influence zones 30, 30' and the remaining material of the blanks 211', 212'.

Figure 5:
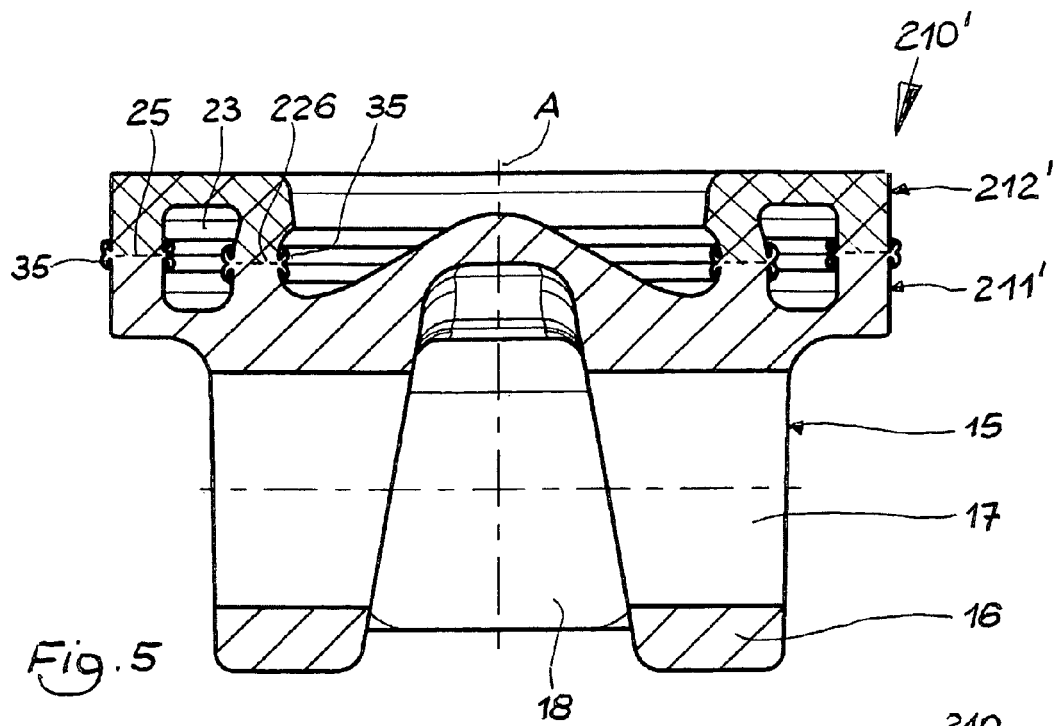
FIG. 5 the piston blank produced from the components according to FIG. 4, for a piston according to the invention, in section.
Figure 6:
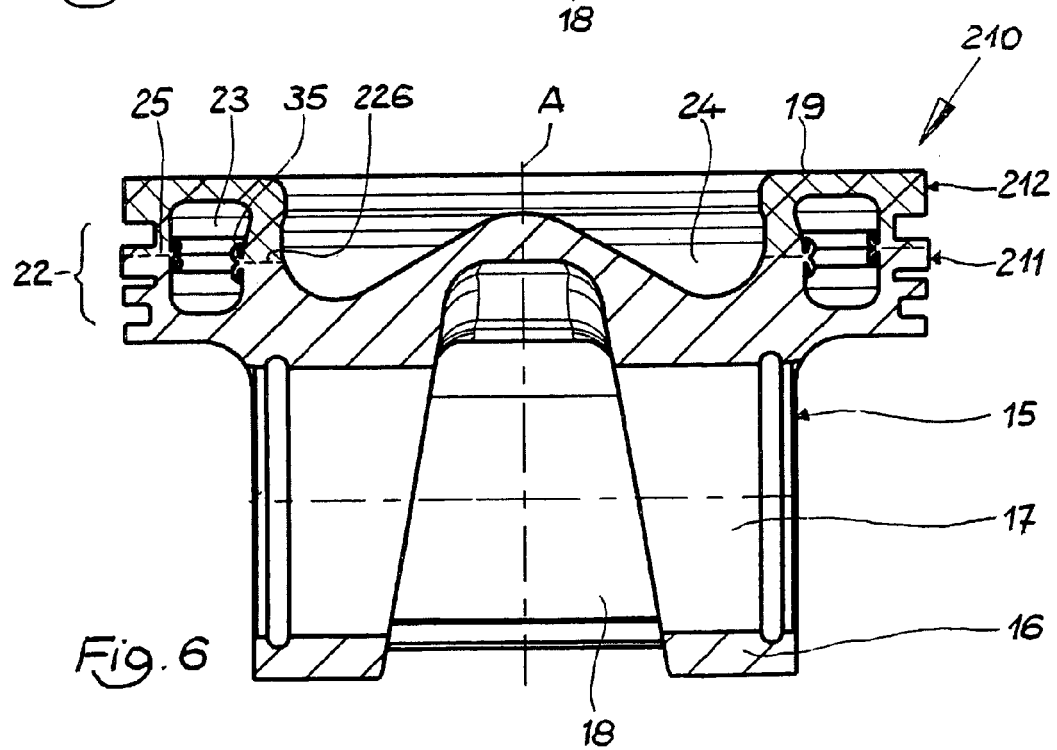
FIG. 6 the piston according to the invention, produced from the piston blank according to FIG. 5.

The piston blank 210' according to FIG. 5 has friction-welding beads 35 along the outer friction-welding seam 25 and along the inner friction-welding seam 226 as the result of the friction-welding process described above. The piston blank 210' is re-machined or finished in known manner, depending on the configuration of the blanks 211', 212'. For example, the external shape, surfaces, combustion chamber bowl, pin bores, etc. can be finished, and the accessible friction-welding beads 35 are removed. According to the invention, the ring belt 22 with ring grooves 34, 36, 37 (see FIGS. 1b, 2b) are worked in, in such a manner that the lower groove flank 34' of the first ring groove 34 is positioned in the region of the heat influence zone 30, and the distance of the lower groove flank 34' of the ring groove 34 from the center of the outer friction-welding seam 25, 125 is less than the axial height of the heat influence zone 30 (see FIGS. 1b and 2b). In the end result, the lower groove flank 34' is hardened, particularly in the region of its outer edge 34". The hardness of the groove flank now lies at approximately 400 to 600 HV (Vickers), which corresponds to an increase in hardness, according to the invention, by approximately 100 to 200 HV (Vickers), and leads to an improvement in the wear resistance. In the final analysis, a finished piston 210 according to FIG. 6 is obtained. Of course, any other ring groove 36, 37 can also be hardened in this manner. The same holds true for other partial regions and partial structures of the piston 10, 110, 210 according to the invention that are supposed to be subjected to hardening. Such partial regions and partial structures should lie in the region of the heat influence zones 30, 30' after friction welding.

The invention claimed is:

1. Method for the production of a piston (10, 110, 210) for an internal combustion engine, composed of a first piston component (11, 111, 211) and a second piston component (12, 112, 212), comprising the following method steps:
    (a) making available a blank (211') of the first piston component (11, 111, 211) composed of a heat-treatable steel or a precipitation-hardenable steel, having at least one joining surface (29, 31), and positioning the at least one joining surface (29,31) of the blank (211') of the first piston component in such a manner that the at least one joining surface (29,31) lies within a partial region or partial structure of the piston to be produced, which is supposed to be hardened,
    (b) making available a blank (212') of the second piston component (12, 112, 212) composed of a heat-treatable steel or a precipitation-hardenable steel, having at least one joining surface (32, 33), and positioning the at least one joining surface (32, 33) of the blank in such a manner that the at least one joining surface (32, 33) of the blank of the second piston component lies within a partial region or partial structure of the piston to be produced, which is supposed to be hardened,
    (c) tempering or precipitation-hardening the blanks (211', 212'),
    (d) connecting the blank (211') of the first piston component (11, 111, 211) with the blank (212') of the second piston component (12, 112, 212) by way of their joining surfaces (29, 31, 32, 33), by means of friction welding, to produce a piston blank (210'), with the formation of at least one friction-welding seam (25, 26, 125, 226) as well as a heat influence zone (30, 30') in the region of the at least one friction-welding seam (25, 26, 125, 226), such that the at least one friction-welding seam (25, 26, 125, 126) is positioned so that a partial region or partial structure of the piston which is supposed to be hardened, lies in the heat influence zone (30,30'), wherein at least one blank (211', 212') is provided with at least one ring groove (34, 36, 37) and at least one pair of corresponding joining surfaces (29, 32) of the blanks (211, 212) are positioned in such a manner that after step (d), the distance of a lower groove flank (34') of a ring groove (34) from the center of the outer friction-welding seam (25, 125) is less than the axial height of the heat influence zone (30) of this friction-welding seam (25, 125), (e) annealing or low-stress annealing of the piston blank (210') after the step of welding, thereby preserving the heat influence zone(s) (30, 30'), (f) re-machining and/or finishing the piston blank (210') to produce a piston (10, 110, 210).

2. Method according to claim 1, wherein the blanks (211', 212') are pre-machined between step (c) and step (d).

3. Method according to claim 1, wherein the at least one friction-welding seam (26, 125) is configured in such a manner that it runs at an acute angle ($\alpha$) or an obtuse angle ($\beta$) relative to the piston center axis (A), in the radial direction.

4. Method according to claim 1, wherein in step (a), a blank (211') of a piston base body (11, 111, 211) having an outer joining surface (29) and an inner joining surface (31) as well as a circumferential lower cooling channel part (23a) between the two joining surfaces (29, 31) is made available, and wherein in step (b), a blank (212') of a piston ring element (12, 112, 212) having an outer joining surface (32) and an inner joining surface (33) as well as a circumferential upper cooling channel part (23b) between the two joining surfaces (32, 33) is made available.

5. Method according to claim 4, wherein a blank (212') of a piston ring element (12, 112, 212) that has a combustion chamber bowl (24) is used.

6. Method according to claim 4, wherein a blank (212') of a piston ring element (12, 112, 212) that has at least one wall region (28') of a combustion chamber bowl (24) is used, and wherein a blank (211') of a piston base body (11, 111, 211) that has at least one crown region (27) of a combustion chamber bowl (24) is used.

7. Piston (10, 110, 210) for an internal combustion engine, composed of a first piston component (11, 111, 211) and a second piston component (12, 112, 212), whereby the piston (10, 110, 210) has a piston crown (19), a circumferential top land (21), and a circumferential ring belt (22) provided with ring grooves (34, 36, 37), as well as a piston skirt (15), wherein the first piston component (11, 111, 211) and the second piston component (12, 112, 212) consist of a tempered steel or a precipitation-hardened steel, and are connected with one another by means of friction welding, wherein the at least one friction-welding seam (25, 26, 125, 226) is surrounded by a heat influence zone (30, 30'), and wherein the at least one friction-welding seam (25, 26, 125, 126) is positioned in such a manner that the distance of a lower groove flank (34') of a ring groove (34) from the center of the friction welding seam (25,125) is less than the axial height of the heat influence zone (30) of this friction welding seam (25, 125).

8. Piston according to claim 7, wherein the at least one friction-welding seam (26, 125) is configured in such a manner that it runs perpendicular to or at an acute angle ($\alpha$) or at an obtuse angle ($\beta$) relative to the piston center axis (A).

9. Piston according to claim 7, wherein the first piston component is a piston base body (11, 111, 211) that has at least one piston skirt (15), wherein the second piston component is a piston ring element (12, 112, 212) that has at least a piston crown (19), a circumferential top land (21), and a circumferential ring belt (22) provided with ring grooves (34, 36, 37), and wherein the piston base body (11) and the piston ring element (12, 112, 212) form a circumferential cooling channel (23).

10. Piston according to claim 7, wherein the piston ring element (12, 112, 212) has at least one wall region (28') of a combustion chamber bowl (24), and wherein the piston base body (11, 111, 211) has at least one crown region (27) of a combustion chamber bowl (24).

11. Method for the production of a piston (10, 110, 210) for an internal combustion engine, composed of a first piston component (11, 111, 211) and a second piston component (12, 112, 212), comprising the following method steps:

(a) making available a blank (211') of the first piston component (11, 111, 211) composed of a heat-treatable steel or a precipitation-hardenable steel, having at least one joining surface (29, 31), and positioning the at least one joining surface (29, 31) of the blank (211') of the first piston component (11, 111, 211) in such a manner that the at least one joining surface (29, 31) lies within a partial region or a partial structure of the piston to be produced, which is supposed to be hardened, (b) making available a blank (212') of the second piston component (12, 112, 212) composed of a heat-treatable steel or a precipitation-hardenable steel, having at least one joining surface (32, 33), and positioning the at least one joining surface (32, 33) of the blank (212') of the second piston component (12, 112, 212) in such a manner that the at least one joining surface (32, 330) lies within a partial region or a partial structure of the piston to be produced, which is supposed to be hardened, (c) tempering or precipitation-hardening the blanks (211', 212'), (d) connecting the blank (211') of the first piston component (11, 111, 211) with the blank (212') of the second piston component (12, 112, 212) by way of their joining surfaces (29, 31; 32, 33), by means of friction welding, to produce a piston blank (210'), with the formation of at least one friction-welding seam (25, 26, 125, 226) as well as a heat influence zone (30, 30') in the region of the at least one friction-welding seam (25, 26, 125, 226), such that the at least one friction-welding seam (25, 26, 125, 226) is positioned so that a partial region or partial structure of the piston which is supposed to be hardened, lies in the heat influence zone (30, 30'), (e) annealing or low-stress annealing of the piston blank (210') after the step of welding, thereby preserving the heat influence zone(s) (30, 30'), (f) re-machining and/or finishing the piston blank (210') to produce a piston (10, 110, 210);

wherein the piston blank (210') is provided with at least one ring groove (34, 36, 37), in such a manner that the distance of a lower groove flank (34') of a ring groove (34) from the center of the outer friction welding seam (25, 125) is less than the axial height of the heat influence zone (30) of this friction welding seam (25, 125).

12. Method according to claim 11, wherein the blanks (211', 212') are pre-machined between step (c) and step (d).

13. Method according to claim 11, wherein the at least one friction-welding seam (26, 125) is configured in such a manner that it runs at an acute angle (α) or an obtuse angle (β) relative to the piston center axis (A), in the radial direction.

14. Method according to claim 11, wherein in step (a), a blank (211') of a piston base body (11, 111, 211) having an outer joining surface (29) and an inner joining surface (31) as well as a circumferential lower cooling channel part (23a) between the two joining surfaces (29, 31) is made available, and wherein in step (b), a blank (212') of a piston ring element (12, 112, 212) having an outer joining surface (32) and an inner joining surface (33) as well a circumferential upper cooling channel part (23b) between the two joining surfaces (32, 33) is made available.

15. Method according to claim 14, wherein a blank (212') of a piston ring element (12, 112, 212) that has a combustion chamber bowl (24) is used.

16. Method according to claim 14, wherein a blank (212') of a piston ring element (12, 112, 212) that has at least one wall region (28') of a combustion chamber bowl (24) is used, and wherein a blank (211') of a piston base body (11, 111, 211) that has at least one crown region (27) of a combustion chamber bowl (24) is used.

* * * * *